United States Patent [19]

Holbus et al.

[11] 4,359,796
[45] Nov. 23, 1982

[54] CAR WASHING MECHANISM

[76] Inventors: Edward Holbus, 21 Stonewood Ct.; Jeffrey A. Holbus, 1923 Geneva St., both of Racine, Wis. 53402; William N. Holbus, 4326 Kennedy Dr., Apt. 202, Racine; Wis. 53404

[21] Appl. No.: 289,800

[22] Filed: Aug. 3, 1981

[51] Int. Cl.³ ............................................. B60S 3/06
[52] U.S. Cl. ............................ 15/53 AB; 15/DIG. 2
[58] Field of Search ............ 15/DIG. 2, 53 A, 53 AB

[56] References Cited

U.S. PATENT DOCUMENTS

| | | | |
|---|---|---|---|
| 3,350,733 | 11/1963 | Hanna | 15/53 AB |
| 3,570,034 | 3/1971 | Lanfrankie | 15/53 AB |
| 3,772,725 | 11/1973 | Shelstad | 15/53 AB |

Primary Examiner—Edward L. Roberts

Attorney, Agent, or Firm—Quarles & Brady

[57] ABSTRACT

A car wash mechanism includes a vertical rotating brush mounted on the end of a horizontal boom slidably received in a cage mounted on an upright standard to the side of the path of travel of a vehicle. The bottom of the cage is mounted to the standard for pivotal movement and the top of the cage is pivotally mounted on a slidable carriage. The cage can be tilted between one position in which the boom will extend outwardly of the cage towards the center of the track and a second position in which the boom will retract inwardly of the cage and thereby position the brush closer to the standard. A fluid cylinder is actuated to shift the carriage and thereby tilt the cage under the control of a switch which has its actuator engaged by the cage when the cage is pivoted to the side by a passing vehicle.

12 Claims, 10 Drawing Figures

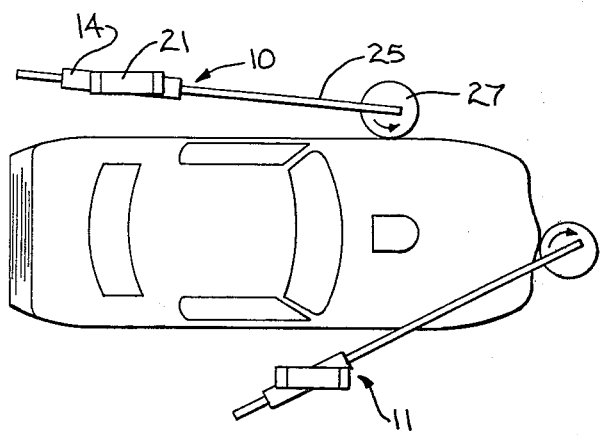
FIG. IA
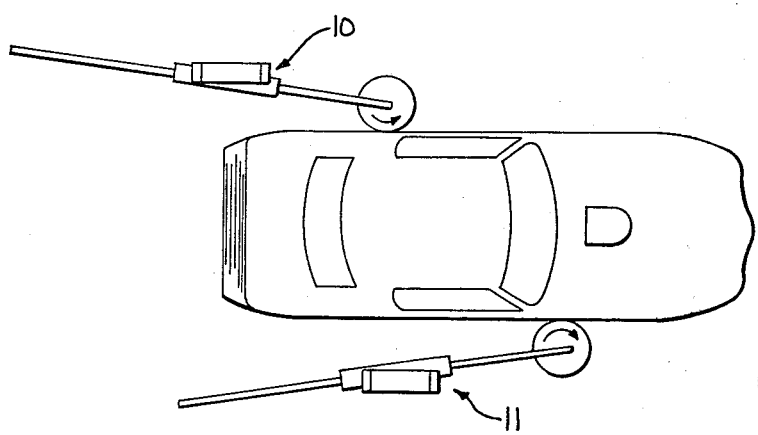
FIG. IB
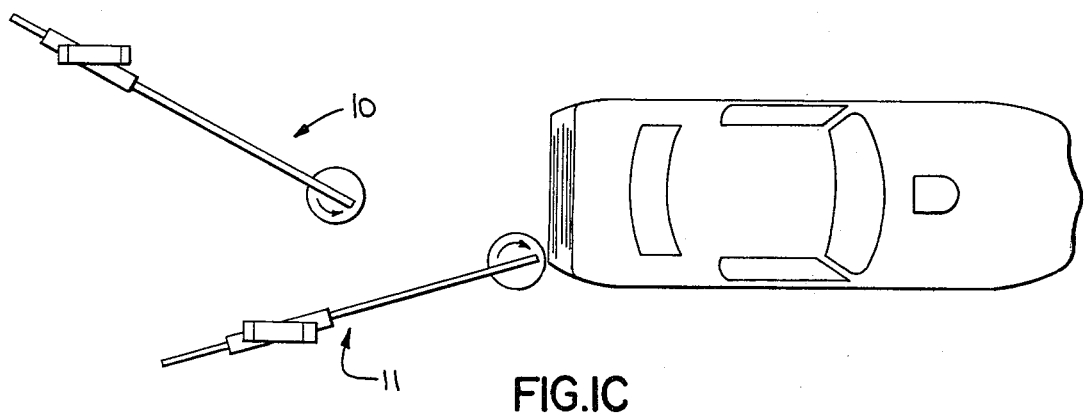
FIG. IC

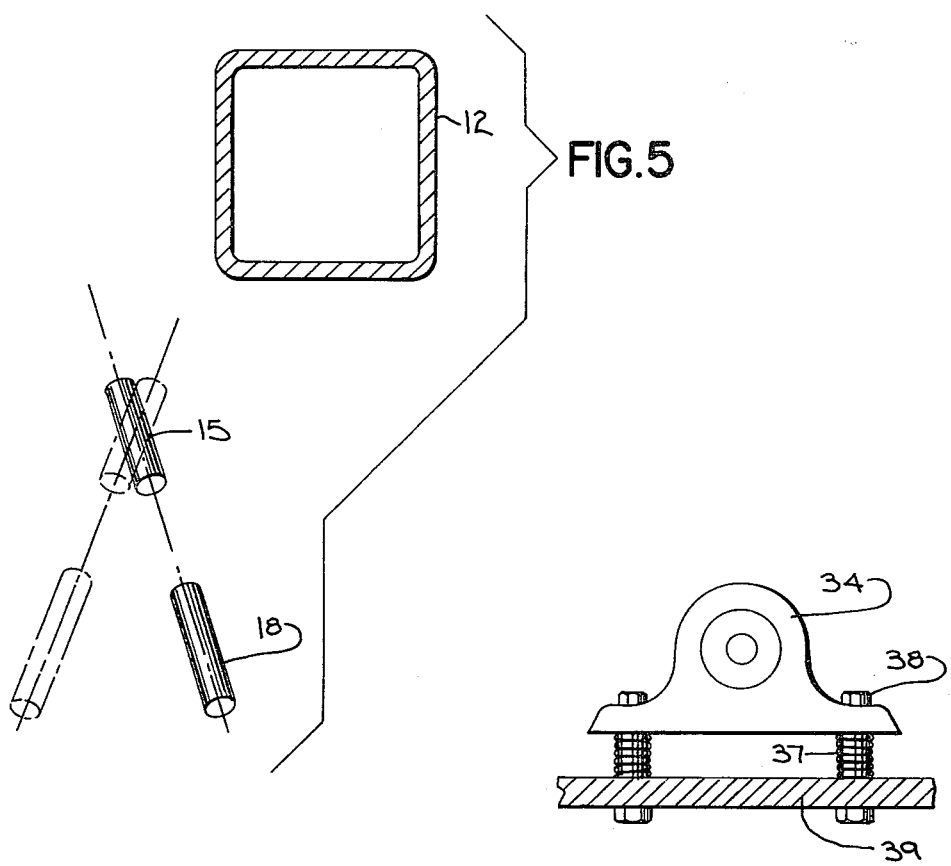
FIG.5
FIG.6
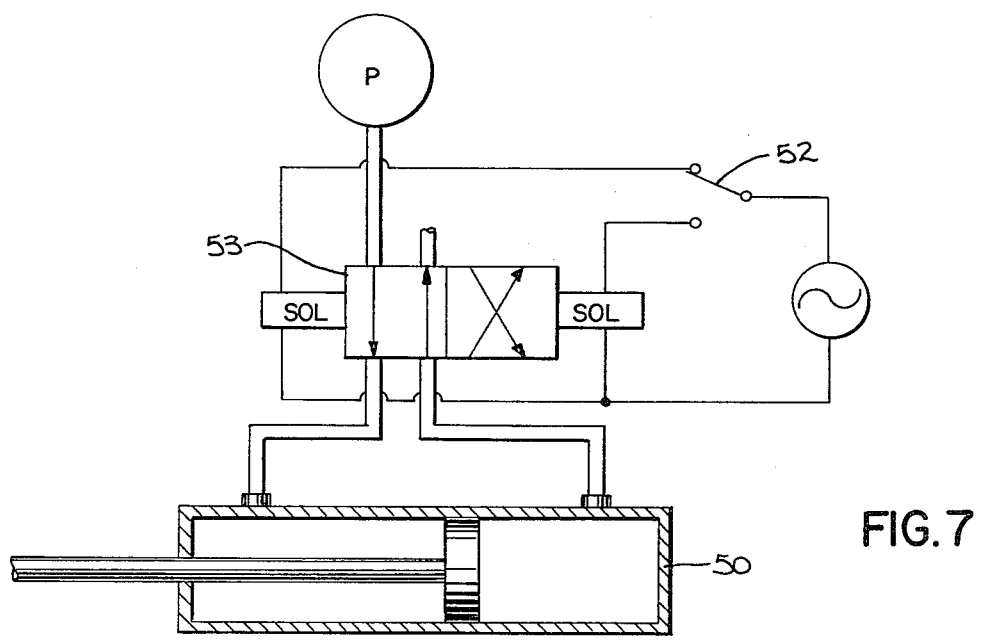
FIG.7

CAR WASHING MECHANISM

BACKGROUND OF THE INVENTION

This invention relates to car washing apparatus, and more particularly to a mechanism for mounting a rotating brush which can contact the front and rear as well as the side of a vehicle passing the brush location.

Automatic car wash installations typically use rotating brushes to clean the surface of the vehicle. Some installations employ separate brushes to clean each side and additional brushes to clean the front and rear of the vehicle. There has been some effort made to develop car wash apparatus in which a single brush can clean the front and rear of the vehicle as well as one side. This is known as a wrap-around brush construction. In such apparatus a pair of rotary brushes are typically carried on arms positioned in sequential order on opposite sides of the track along which the vehicle is moved. As the vehicle passes along the track, the arms are moved so that each of the brushes will first contact the front of the car and then scrub laterally and outwardly from the center of the car towards one side. As the vehicle continues to move, the brushes will contact the side of the car and finally will return towards the center of the car and scrub the back of the car in doing so.

Examples of such wrap-around brush constructions are found in U.S. Pat. No. 3,350,733 issued Nov. 7, 1967 to D. C. Hanna, U.S. Pat. No. 3,570,034 issued Mar. 17, 1971 to Lanfrankie and U.S. Pat. No. 3,772,725 issued Nov. 20, 1973 to Shelstad. In the latter patent, the rotating brush is mounted on a carriage which travels along a boom whose free end is inclined downward and towards the center of the path of travel of the vehicle. The movement of the vehicle causes the boom to pivot towards the side so that the brush will contact the side of the vehicle as the vehicle passes the brush and the action of the rotating brush on the surface of the vehicle causes the carriage to move upwardly along the boom. Gravity is employed to return the carriage towards the free end of the boom so that the brush can follow along the rear of the vehicle as it passes. Such an arrangement relies totally on gravity and the action of the brush against the surface of the vehicle to properly position the brush. Because vehicles of different widths must be accommodated within the same car wash installation, the force produced by the action of the brush against the surface of the vehicles will vary and the retraction of the carriage along the boom will consequently also vary. Thus, with this arrangement the positioning of the brush end of the boom is unfortunately dependent in part upon the size of the vehicle being washed.

We have developed an automatic wrap-around type brush mechanism which is positioned by the action of the passing car and which is moved relative to a support by gravity but which will accommodate vehicles of different widths without affecting the proper positioning of the brush relative to the surfaces of the vehicle.

SUMMARY OF THE INVENTION

In accordance with the invention we provide a car wash mechanism which includes a boom mounting a rotating brush on one end and slidably received in a cage mounted on an upright support. The cage is mounted for pivoting and tilting motion on the support and means are provided to tilt the cage between one position in which the boom is fully extended from the cage and a second position in which the boom is retracted within the cage.

The combination of the pivoting and tilting of the cage allows the brush on the end of the boom to follow the contours of a vehicle passing the mechanism from the front of the vehicle, along the side, and across the rear. The tilting of the cage may be controlled by the pivoting of the cage as the boom is forced to the side of a passing vehicle.

A principal object of the invention is to provide a wrap-around brush mechanism which effectively accommodates vehicles of different sizes.

Another object of the invention is to provide a wrap-around brush construction in which the brush can be rotated at a slower speed so that there is less danger of damaging the vehicle surfaces.

It is a further object of the invention to provide a wrap-around brush mechanism which utilizes a tilting boom and a brush which constantly descends under the force of gravity to properly position the brush with respect to the contours of the vehicle.

The foregoing and other objects and advantages will appear in the detailed description which follows. In the description, reference is made to the accompanying drawings which illustrate a preferred embodiment of the invention.

BRIEF DESCRIPTION OF THE DRAWINGS

FIGS. 1A, 1B and 1C are top plan views of a car wash installation which includes a pair of car wash mechanisms disposed on either side of the path of travel of vehicles through the car wash;

FIG. 5 is a schematic view illustrating the relationship of the pivot axes of the cage relative to the vertical axis of the standard;

FIG. 6 is a view in elevation of a bearing block mounting for rollers which guide the boom; and FIG. 7 is a schematic view of the pneumatic circuit for the car wash mechanism.

DETAILED DESCRIPTION OF THE PREFERRED EMBODIMENT

As shown in FIGS. 1A, 1B and 1C, two car wash mechanisms 10 and 11 are arranged on opposite sides of the path of travel of vehicles through a car wash installation. The vehicles may be towed or driven along a track in a known manner. The mechanisms 10 and 11 are so arranged that the rotating brush of first one and then the other is encountered as the vehicle travels along the track.

Figure 2A:
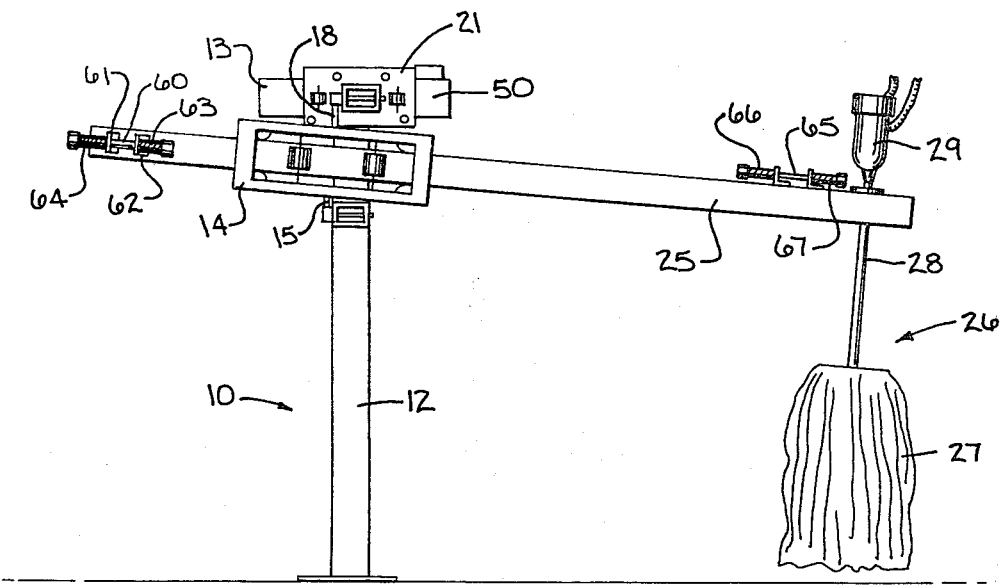
FIGS. 2A and 2B are views in elevation of a car wash mechanism in accordance with the invention and illustrating the two tilted positions of the mechanism.
Figure 2B:
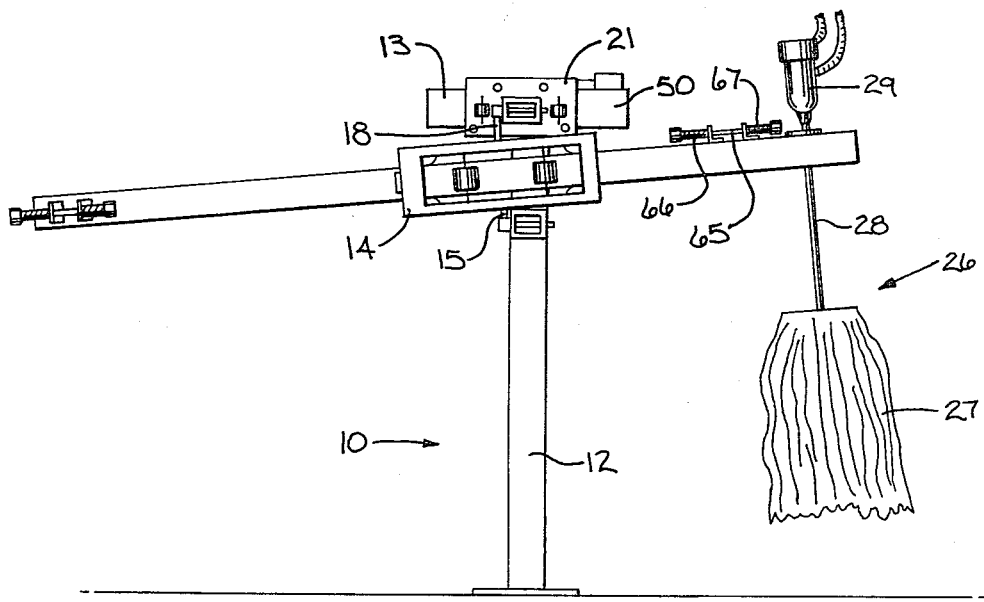

Referring to FIGS. 2A and 2B, each of the car wash mechanisms 10 and 11 generally includes an upright support standard 12 which has a cross-arm 13 formed at its top. A cage, designated generally by the reference numeral 14, is mounted on the standard 12 so as to be capable of pivoting through a generally horizontal plane and tilting between the two positions shown in FIGS. 2A and 2B. To accommodate this motion, a lower pivot pin 15 depends from the bottom of the cage 14 and is held in a bearing block 16 mounted on a side of a short beam 17 cantilevered from the standard 12. An upper pivot pin 18 extends upwardly from the top of the cage 14 and is mounted in an upper bearing block 19 secured to a projecting beam 20 mounted on a carriage 21. The carriage 21 is adapted to slide along the cross-arm 13 of the standard 12. As it is shifted along the cross-arm 13, the carriage will tilt the cage 14 between the positions shown in FIGS. 2A and 2B.

An elongated box-shaped boom 25 is slidably received in the cage 14. The boom 25 mounts a brush assembly 26 at its outer end which includes a brush 27 mounted on a depending shaft 28 connected to and rotated by a motor 29 secured to the free end of the boom 25.

The cage 14 is fabricated from a series of flat bars which form its main edges and from steel plates. The cage 14 mounts a series of horizontal and vertical rollers which receive the boom 25 to allow it to slide freely within the cage 14. Specifically, there are a pair of front rollers 30 mounted on vertical shafts 31 held in bearing blocks secured to the cage 14 at each end of the shafts 31. There is also a pair of rear vertical rollers 32 similarly mounted in the rear of the cage 14. A pair of horizontal upper rollers 33 are mounted on horizontal shafts held at their ends in bearing blocks 34 secured to the cage 14 and a similar pair of lower rollers 35 are mounted on horizontal shafts secured at their ends in bearing blocks 36 mounted in the cage. The peripheries of the vertical rollers 30 and 32 and of the horizontal rollers 33 and 35 define between them a rectangular opening which matches the outer shape of the boom 25. The upper rollers 33 and lower rollers 35 are of a width which is close to the width of the boom 25 to prevent the boom 25 from canting within the rectangular opening defined by the rollers. All of the bearing blocks for the vertical and horizontal rollers are mounted on the inside of the flat bars, although the bearing blocks could be mounted on the outside of the bars.

Certain of the bearing blocks for the rollers are mounted on springs which permit adjustment of the roller positions to accommodate variations and tolerances in the size and shape of the periphery of the boom 25. As shown in FIG. 6, spring mounting is accomplished by coil springs 37 which encircle the bolts 38 which attach a bearing block to a leg 39 of the angle bars. In the mechanism 10 shown in FIGS. 2A and 2B, bearing blocks 34 for the upper rollers 33 would be spring mounted and the bearing blocks for the left roller of the front rollers 30 and for the right rollers of the rear rollers 32 would also be spring mounted. The remaining bearing blocks are mounted on spacers or directly to the bars so that their distance from a leg of an angle bar is the same as the nominal distance of a spring mounted bearing block from the leg. Alternatively, all of the bearing blocks can be mounted on springs.

The carriage 21 is also mounted on the cross-arm 13 of the standard 12 by a series of vertical and horizontal rollers. Specifically, a pair of front vertical rollers 40 are mounted on vertical shafts journaled in bearing blocks 41 secured to the front side of the carriage 21. Openings 42 are provided in the front side of the carriage 21 to allow the rollers 40 to project through to contact the front face of the cross-arm 13. A similar pair of rear vertical rollers (not shown) are mounted on the backside of the carriage and project therethrough to engage the rear face of the cross-arm 13. A pair of upper horizontal rollers are mounted in bearing blocks 43 in the carriage 21 above the cross-arm 13 in the space between the vertical rollers 40. Finally, a pair of lower horizontal rollers 44 are mounted in bearing blocks 45 secured on the carriage 21 beneath the cross-arm 13.

The carriage 21 is moved along the cross-arm 13 by a double acting pneumatic cylinder 50. The pneumatic cylinder 50 is mounted on a shaft extension of the cross-arm 13 and has its piston rod connected to the carriage 21.

Figure 3:
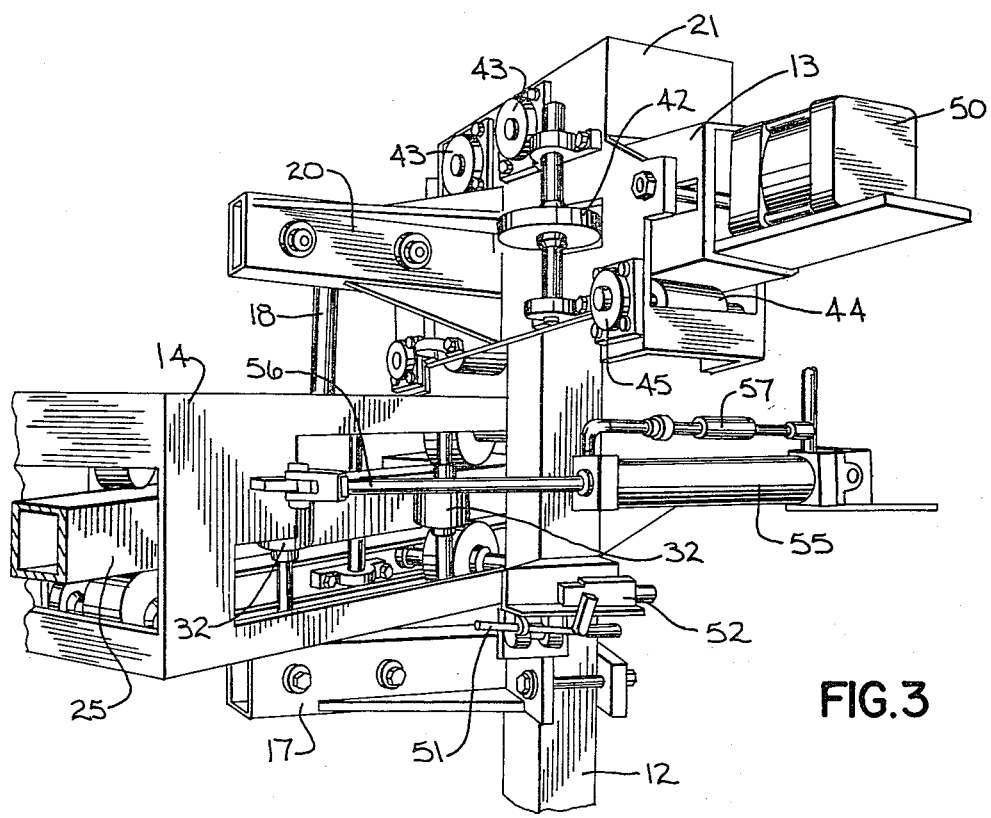
FIG. 3 is a view in perspective of the upper end of the support with the cage and shifting mechanism for the cage.
Figure 4:
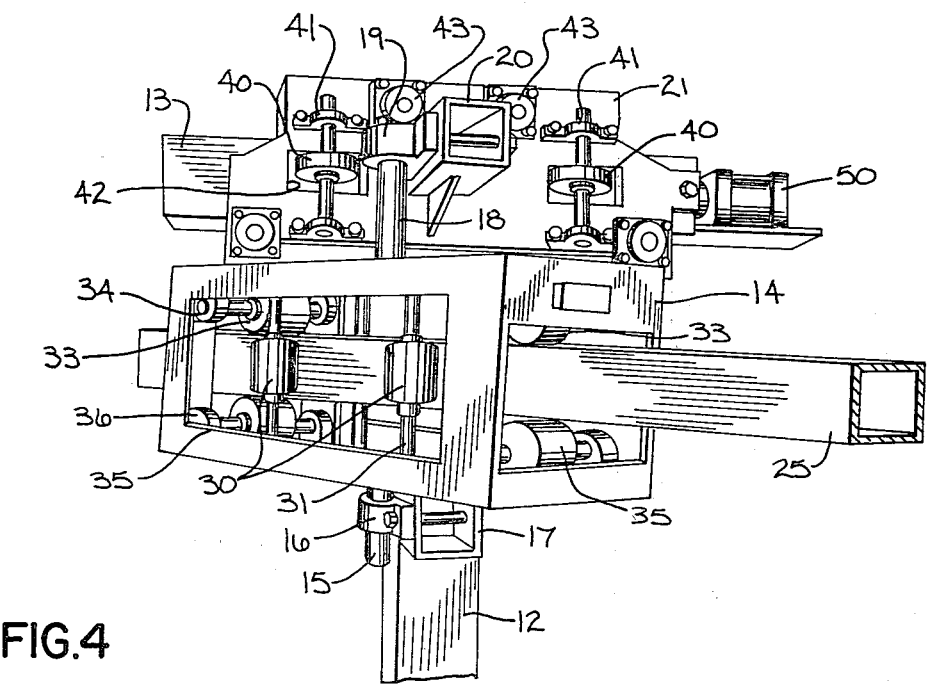
FIG. 4 is another view in perspective similar to FIG. 3 but viewed from the front of the standard.

The bearing block 19 for the upper pivot pin 18 contains a linear spherical bearing which can accommodate angular and rotary movement of the pivot pin 18 with respect to the bearing block 19 and which also permits the upper pivot pin 18 to slide within the bearing. Alternatively, the bearing block 19 could contain a spherical bearing or bushing which has a sloppy fit in the bearing block 19. The bearing block 16 for the lower pivot pin 15 contains a spherical bearing which will accommodate angular and rotary movement of the pivot pin 15 relative to the bearing block 16. The bearing block 19 for the upper pivot pin 18 is disposed at a greater distance from the standard 12 than is the bearing block 16 for the lower pivot pin 15. As a result, the top of the cage 14 is always disposed at a greater distance from the standard 12 than is the bottom of the cage 14. The relative attitudes of the pivot pins 15 and 18 and the standard 12 at the two extremes of tilted position of the cage 14 is illustrated in FIG. 5. As a result of the positioning of the upper and lower pivot pins relative to the standard, when the cage is tilted by the cylinder 50 to the position illustrated in FIG. 2A the front of the cage 14 is tilted down and toward the center of the track for the vehicle. This is the position of the elements illustrated in FIGS. 3 and 4. The weight of the brush assembly 26, the boom 25 and any weights which may be added to the boom will always urge the boom 25 to an extended position relative to the cage 14 whenever the cage 14 is tilted forward as shown in FIG. 2A. Thus, when the cage 14 is tilted forward and if a vehicle is not in contact with the brush 27, the boom 25 will naturally assume the position in which the mechanism 10 is shown in FIG. 1C. In that position, the brush 27 is positioned at or beyond the center line of the track along which the cars travel.

As a result of the relative attitudes of the pivot pins 15 and 18 and the standard 12, when the cage 14 is tilted forward (FIG. 2A) the cage and boom 25 can pivot through a plane which is slightly inclined from the horizontal and which slopes toward the exit end and center of the vehicle track. When the cage 14 is tilted rearward (FIG. 2B), the cage 14 and boom 25 can pivot through a different plane which is also slightly inclined from the horizontal and which slopes toward the entrance end and center of the track.

As a car encounters the brush 27 positioned in its path of travel on the track, the direction of rotation of the brush 27 will cause it to walk off of the front of the car and be moved to the side of the car. This will pivot the cage 14 in the first mentioned plane. When the cage 14 is pivoted by the movement of the brush 27 and boom 25 to the side of the track a predetermined amount, the cage 14 will engage the spring loaded actuator 51 of an electric switch 52 which controls the operation of the air cylinder 50 by means of a two position solenoid operated valve 53. Actuating the switch 51 by the pivoting of the cage 14 to the side will supply air pressure to the cylinder end of the air cylinder 50 thereby extending the piston rod to shift the carriage 21 on the cross-arm 13. This results in the cage 14 being tilted to its second position shown in FIG. 2B. Gravity will then cause the boom 25 to retract inwardly of the carriage 14 so that the brush assembly 26 is moved toward the standard 12. The rotation of the brush 27 against the side of the vehicle may assist in retracting the boom 25 into the cage 14. However, the retraction of the boom 25 and brush assembly 26 does not depend upon the action of the brush 27 against the vehicle's side. As a result, the brush can be rotated at a slower speed than in prior constructions which rely upon the reaction of the brush against the vehicle to retract the brush. This slower speed is less likely to cause damage to the surface of the vehicle.

When the vehicle passes to the point where the side of the vehicle no longer holds the brush 27 to the side of the track, the natural inclination of the pivots for the cage 14 cause the cage 14 to pivot outwardly from the standard under the weight of the boom 25 and brush assembly 26. This will release the switch actuator 51 and air under pressure will be admitted to the rod end of the air cylinder 50 so that the cage 14 will be tilted forwardly by the cylinder 50 to assume its initial position as illustrated in FIG. 2A. The retracted boom 25 will then extend outwardly from the cage 14 under the force of gravity. Since the boom 25 moves from a point of retraction the brush 27 will follow the contours of the rear of the vehicle as it passes by.

A pneumatic cylinder 55 has its piston 56 connected to the rear face of the forward end of the cage 14. The cylinder 55 is mounted on an extension of the standard 12 and has both sides of its piston connected to a reservoir (not shown). The cross connection between the rod and piston ends of the cylinder 55 is through a flow restricter 57. Accordingly, the cylinder 55 functions as a dash pot or shock absorber to moderate pivotable movement of the cage 14.

Excessive extension of the boom 25 from the cage 14 is prevented by a shock absorber arrangement which includes a pipe 60 which is journaled in a pair of spaced angle brackets 61 and 62 and is capped at both ends. Coiled springs 63 and 64 surround the ends of the pipe 60 and are trapped between the capped ends and the brackets 61 and 62, respectively. The inner capped end of the pipe 60 can engage the rear end of the cage 14 to act as a stop against complete withdrawal of the boom 25 from the cage 14. A similar shock absorber arrangement including a capped pipe 65 and coiled springs 66 and 67 is mounted on the top of the boom 25 adjacent the brush 27 and is engageable with the front end of the cage 14 to act as a stop preventing excessive retraction of the boom 25 within the cage 14. Suitable stops in the form of plates or brackets (not shown) may be used to limit the degree of pivotal movement of the cage 14 on the standard 12.

It will be seen from the foregoing description that the invention provides a mounting for a rotating brush which will maintain the brush in contact with the surface of a passing vehicle. A pair of such car wash mechanisms will provide complete washing of the front, rear and sides of the vehicle. A separate brush is typically provided to scrub the top surfaces of the car including the hood and rear deck.

In most car wash installations the wheels on one side of the vehicle, usually the drivers side, are held in a track. The brush of the car wash mechanism on that side of the vehicle path will encounter side surfaces of vehicles which are essentially at the same distance from the standard. However, the brush of the car wash mechanism on the opposite side will encounter vehicles of different widths and therefore will be moved to a greater or lesser extent through the pivotal planes. The amount and direction of the forces generated between the rotating brush and the surface of the vehicle will therefore vary depending upon the size of the vehicle. The car wash mechanism of the present invention does not depend upon such forces to retract the brush toward the standard. Therefore, the brush will always be in a proper retracted position so as to be capable of extending as it sweeps across the rear of the passing vehicle.

We claim:

1. A car wash mechanism, including:
   an upright support;
   a tiltable cage pivotably mounted on said support;
   a boom slidably received within said cage and mounting a rotating brush adjacent its outer end; and
   means for tilting said cage between a first position in which the boom slides outwardly of said cage under the force of gravity and a second position in which the boom retracts within said cage under the force of gravity and by the reaction of the rotating brush against a car surface.

2. A car wash mechanism in accordance with claim 1 wherein said tilting means is actuated to tilt the cage from said first position to said second position when said cage is pivoted to a predetermined position.

3. A car wash mechanism adapted to be positioned to one side of a path for vehicles, comprising:
   a vertical standard;
   a generally horizontal boom mounting a vertical rotating brush at one end;
   a cage slidably receiving said boom;
   means mounting said cage on said standard for pivotal movement of said boom relative to said standard and for tilting movement of said cage between a first position in which the boom slides outwardly of the cage and toward the center of the path and a second position in which the boom retracts within the cage; and
   means for tilting said cage between said positions, said means being responsive to the pivotal position of said boom relative to said standard.

4. A car wash mechanism in accordance with claim 3, wherein said mounting means includes a lower fixed pivot joining the bottom of the cage to said standard and an upper movable pivot joining the top of the cage to a shiftable member slidably received for transverse movement on said standard.

5. A car wash mechanism in accordance with claim 4, wherein said tilting means comprises a fluid cylinder connecting said shiftable member to said standard, said fluid cylinder being responsive to a switch which is actuated by said cage when the cage is pivoted by the passage of a vehicle on said track.

6. A car wash mechanism adapted to be positioned to one side of a track for vehicles, comprising:
   a vertical standard having a cross-arm;
   a generally horizontal boom mounting a vertical rotating brush at one end;
   a cage slidably receiving said boom;
   means pivotally mounting the bottom of said cage on said standard;
   a carriage slidably received on said cross-arm, said carriage pivotally mounting the top of said cage;
   means for shifting said carriage to tilt said cage between a first position in which the weight of the brush at the end of the boom causes the boom to slide outwardly of the cage and toward the center of the track and a second position in which the weight of the brush will cause the boom to retract within the cage; and means responsive to the pivotal movement of the cage to cause said shifting means to move said cage to said second position whenever the boom is forced to the side by a passing vehicle.

7. A car wash mechanism in accordance with claim 6 wherein;

the pivotal mounting at the top of said carriage is disposed at a greater distance from the standard than is the pivotal mounting at the bottom of the cage.

8. A car wash mechanism in accordance with claim 7 wherein;

said cage includes spaced vertical rollers and spaced horizontal rollers which ride the outer surface of said boom.

9. A car wash mechanism in accordance with claim 7 wherein;

said carriage includes spaced vertical rollers and spaced horizontal rollers which ride the outer surface of said cross-arm.

10. A car wash mechanism in accordance with claim 7 wherein said shifting means comprises a double acting fluid cylinder having one of its cylinder and piston rods connected to said cross-arm and the other connected to said carriage.

11. A car wash mechanism in accordance with claim 10 wherein said means responsive to the pivotal movement of the cage comprises a switch having its actuator engaged by the cage when the cage is pivoted to the side.

12. A car wash mechanism in accordance with claim 6 together with a dash pot connected between the cage and the standard to moderate the pivoting of the cage and boom.

* * * * *